United States Patent
Chang

(10) Patent No.: US 10,324,573 B2
(45) Date of Patent: Jun. 18, 2019

(54) SENSING DEVICES FOR SENSING ELECTRICAL CHARACTERISTICS

(71) Applicant: SK hynix Inc., Icheon-si Gyeonggi-do (KR)

(72) Inventor: Keunjin Chang, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 157 days.

(21) Appl. No.: 15/656,584

(22) Filed: Jul. 21, 2017

(65) Prior Publication Data

US 2018/0181230 A1 Jun. 28, 2018

(30) Foreign Application Priority Data

Dec. 22, 2016 (KR) .......................... 10-2016-0177085

(51) Int. Cl.
- G06F 3/044 (2006.01)
- G09G 3/20 (2006.01)
- G06F 3/041 (2006.01)

(52) U.S. Cl.
CPC ............ G06F 3/044 (2013.01); G06F 3/0416 (2013.01); G09G 3/2092 (2013.01); G09G 2310/0291 (2013.01); G09G 2354/00 (2013.01)

(58) Field of Classification Search
CPC .................................. G06F 2203/04103–04113
See application file for complete search history.

(56) References Cited

U.S. PATENT DOCUMENTS

| 2014/0253508 A1* | 9/2014 | Yumoto | G06F 3/044 345/174 |
| 2016/0124544 A1* | 5/2016 | Kang | G06F 3/044 345/174 |
| 2017/0097716 A1* | 4/2017 | Jeong | G06F 3/0416 |

FOREIGN PATENT DOCUMENTS

KR 100601151 B1 7/2006

* cited by examiner

*Primary Examiner* — Sanghyuk Park
(74) *Attorney, Agent, or Firm* — William Park & Associates Ltd.

(57) ABSTRACT

A sensing device may include an integrator configured to sense electrical characteristics of first and second nodes to generate an output voltage. A sensing device may include a switching portion configured to include a plurality of switches, wherein the plurality of switches operate to connect at least one of the plurality of switches to the first node and to connect the remaining switches of the plurality of switches to the second node during each of a plurality of successive switching cycles.

20 Claims, 13 Drawing Sheets

SENSING DEVICES FOR SENSING ELECTRICAL CHARACTERISTICS

CROSS-REFERENCE TO RELATED APPLICATIONS

The present application claims priority under 35 U.S.C 119(a) to Korean Application No. 10-2016-0177085, filed on Dec. 22, 2016, which is herein incorporated by references in its entirety.

BACKGROUND

1. Technical Field

Various embodiments of the present disclosure may generally relate to sensing devices for sensing electrical characteristics, and methods of operating a sensing device.

2. Related Art

Various computing systems such as laptop computers and mobile handsets have employed interface devices such as touch screen panels or touch sensor pads as input devices for users' convenience. The touch screen panels may be combined with display panels to input data into the computing systems. In such a case, users may touch the touch screen panels to input the data into the computing systems.

Each of the interface devices such as the touch screen panels may include an array of touch sensors for sensing the users' touch and sensing devices for recognizing the users' touch. The array of the touch sensors may be comprised of a plurality of capacitors that are two-dimensionally arrayed to sense and store variation of capacitance values of the capacitors touched or pressed by the users. The touch sensors may be configured to perform an operation for accurately and quickly sensing capacitance values of the plurality of capacitors constituting the array of the touch sensors.

SUMMARY

According to an embodiment, a sensing device may be provided. The sensing device may include a sensor array portion, an integrator, a switching portion and a logic circuit. The sensor array portion may include a plurality of sensors. The integrator may include a differential amplifier. The switching portion may include a plurality of switches. The plurality of switches may operate to connect at least one of the plurality of sensors to a first input terminal of the differential amplifier and to connect the remaining sensors of the plurality of sensors to a second input terminal of the differential amplifier during each of a plurality of successive switching cycles. The logic circuit may perform an operation for extracting output data respectively corresponding to the plurality of sensors from an output data matrix generated by the integrator. The integrator may sense electrical characteristics of the sensors to generate the output data matrix.

According to an embodiment, a sensing device may be provided. The sensing device may include a sensor array portion, an integrator, a switching portion and a logic circuit. The sensor array portion may include first to fourth sensors. The integrator may include a differential amplifier. The switching portion may include a plurality of switches that sequentially perform first to fourth switching operations. The first switching operation may be performed to connect the fourth sensor to a first input terminal of the differential amplifier and to connect the first to third sensors to a second input terminal of the differential amplifier. The second switching operation may be performed to connect the third sensor to the first input terminal of the differential amplifier and to connect the first, second and fourth sensors to the second input terminal of the differential amplifier. The third switching operation may be performed to connect the second sensor to the first input terminal of the differential amplifier and to connect the first, third and fourth sensors to the second input terminal of the differential amplifier. The fourth switching operation may be performed to connect the first sensor to the first input terminal of the differential amplifier and to connect the second, third and fourth sensors to the second input terminal of the differential amplifier. The logic circuit may perform an operation for multiplying an output data matrix outputted from the integrator by an inverse matrix of a switching data matrix. The switching data matrix may include elements which are denoted by a numeral of "−1" corresponding to a switching state of the switches connected to the first input terminal of the differential amplifier and a numeral of "+1" corresponding to a switching state of the switches connected to the second input terminal of the differential amplifier.

According to an embodiment, a sensing device may be provided. The sensing device may include a sensor array portion, an integrator, a switching portion and a logic circuit. The sensor array portion may include first to fifth sensors. The integrator may include a differential amplifier. The switching portion may include a plurality of switches that sequentially perform first to fifth switching operations. The first switching operation may be performed to connect the fourth and fifth sensors to a first input terminal of the differential amplifier and to connect the first to third sensors to a second input terminal of the differential amplifier. The second switching operation may be performed to connect the third and fourth sensors to the first input terminal of the differential amplifier and to connect the first, second and fifth sensors to the second input terminal of the differential amplifier. The third switching operation may be performed to connect the second and third sensors to the first input terminal of the differential amplifier and to connect the first, fourth and fifth sensors to the second input terminal of the differential amplifier. The fourth switching operation may be performed to connect the first and second sensors to the first input terminal of the differential amplifier and to connect the third to fifth sensors to the second input terminal of the differential amplifier. The fifth switching operation may be performed to connect the first and fifth sensors to the first input terminal of the differential amplifier and to connect the second to fourth sensors to the second input terminal of the differential amplifier. The logic circuit may perform an operation for multiplying an output data matrix outputted from the integrator by an inverse matrix of a switching data matrix. The switching data matrix may include elements which are denoted by a numeral of "−1" corresponding to a switching state of the switches connected to the first input terminal of the differential amplifier and a numeral of "+1" corresponding to a switching state of the switches connected to the second input terminal of the differential amplifier.

According to an embodiment, a sensing device may be provided. The sensing device may include an integrator configured to sense electrical characteristics of first and second nodes to generate an output voltage. The sensing device may include a switching portion configured to include a plurality of switches. The plurality of switches may operate to connect at least one of the plurality of switches to the first node and to connect the remaining switches of the plurality of switches to the second node during each of a plurality of successive switching cycles.

According to an embodiment, a method of operating a sensing device may be provided. The method may include sensing electrical characteristics of a plurality of sensors to generate an output data matrix. The method may include connecting at least one of a plurality of sensors to a first input terminal of a differential amplifier of an integrator during each of a plurality of successive switching cycles. The method may include connecting the remaining sensors of the plurality of sensors to a second input terminal of the differential amplifier of the integrator during each of the plurality of the successive switching cycles. The method may include extracting output data respectively corresponding to the plurality of sensors from the output data matrix generated by the integrator.

DETAILED DESCRIPTION

Figure 1:
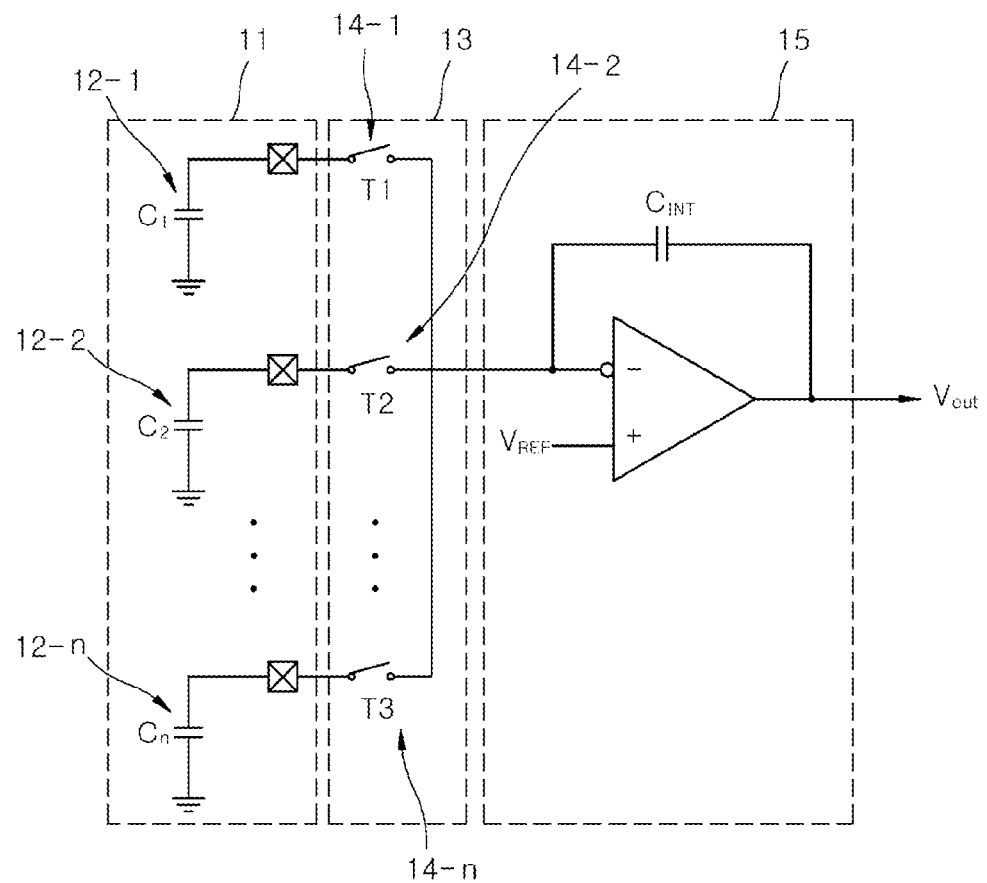
FIG. 1 is a circuit diagram illustrating a sensing device sequentially sensing a plurality of sensors according to an embodiment.

The terms used herein may correspond to words selected in consideration of their functions in the embodiments, and the meanings of the terms may be construed to be different according to ordinary skill in the art to which the embodiments belong. If defined in detail, the terms may be construed according to the definitions.

Unless otherwise defined, the terms used herein have the same meaning as commonly understood by one of ordinary skill in the art to which the embodiments belong.

It will be understood that although the terms first, second, third etc. may be used herein to describe various elements, these elements should not be limited by these terms. These terms are only used to distinguish one element from another element, but not used to define only the element itself or to mean a particular sequence. Thus, a first element in some embodiments could be termed a second element in other embodiments without departing from the teachings of the concepts. Further, when an element is referred to as being "connected" or "coupled" to another element, the element may be electrically or mechanically connected or coupled to the other element directly, or may form a connection relationship or coupling relationship by replacing the other element therebetween. Other words used to describe the relationship between elements should be interpreted in a like fashion.

Same reference numerals or same reference designators refer to same elements throughout the specification. Even though a reference numeral or a reference designator is not mentioned or described with reference to a drawing, the reference numeral or the same reference designator may be mentioned or described with reference to another drawing. In addition, even though a reference numeral or a reference designator is not illustrated in a drawing, it may be mentioned or described with reference to another drawing.

Figure 2:
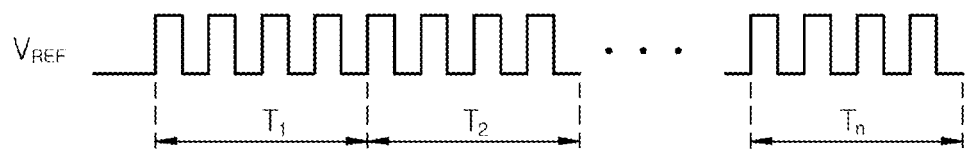
FIG. 2 is a timing diagram illustrating an operation of the sensing device illustrated in FIG. 1.

FIG. 1 is a circuit diagram illustrating a sensing device 10 sequentially sensing a plurality of sensors (i.e., first to $n^{th}$ sensors 12-1, 12-2, ... and 12-$n$) according to an embodiment, and FIG. 2 is a timing diagram illustrating an operation of the sensing device 10 illustrated in FIG. 1.

Referring to FIG. 1, the sensing device 10 may include a sensor array portion 11 and an integrator 15. The sensor array portion 11 may include the plurality of sensors 12-1, 12-2, ... and 12-$n$. The integrator 15 may be configured to include a circuit for sensing a capacitance value of the sensor array portion 11. The sensor array portion 11 may include an array of capacitors whose capacitance values vary according to user's touch, like a touch screen panel or a touch display panel. For example, the sensor array portion 11 may include the plurality of sensors 12-1, 12-2, ... and 12-$n$, capacitance values C1, C2, ... and Cn of which are variable if an input means such as a user's finger or a touch pen is in contact with the plurality of sensors 12-1, 12-2, ... and 12-$n$. Although the plurality of sensors 12-1, 12-2, ... and 12-$n$ are illustrated as capacitors in FIG. 1, the present disclosure is not limited thereto. For example, in some embodiments, the plurality of sensors 12-1, 12-2, ... and 12-$n$ may be realized using other sensors, voltage values or current values of which are variable if an input means such as a user's finger or a touch pen is in contact with the plurality of sensors 12-1, 12-2, ... and 12-$n$.

In an embodiment, the plurality of sensors 12-1, 12-2, ... and 12-$n$ may be realized using a plurality of capacitors, each of which has a capacitance value. The plurality of sensors 12-1, 12-2, ... and 12-$n$ may be coupled to the integrator 15, the integrator 15 may output a voltage value corresponding to the capacitance value C1, C2, ... or Cn of any one of the sensors 12-1, 12-2, ... and 12-$n$ as an output voltage signal Vout. The integrator 15 may include an operational amplifier and a feedback capacitor Cint which is coupled between a negative input terminal and an output terminal of the operational amplifier. Thus, the operational amplifier and the feedback capacitor Cint may constitute a negative feedback circuit. The plurality of sensors 12-1, 12-2, ... and 12-$n$ may be coupled to the negative input terminal of the operational amplifier, and a reference voltage Vref may be applied to a positive input terminal of the operational amplifier. The reference voltage Vref may have a square wave form, as illustrated in FIG. 2.

A switching portion 13 may be coupled between the sensor array portion 11 and the integrator 15. The switching portion 13 may be configured to connect any one of the sensors 12-1, 12-2, ... and 12-$n$ to the integrator 15. The switching portion 13 may include a plurality of switches (e.g., first to $n^{th}$ switches 14-1, 14-2, ... and 14-$n$), and one of the sensors 12-1, 12-2, ... and 12-$n$ may be selectively connected to the integrator 15 by an operation of the plurality of switches 14-1, 14-2, ... and 14-$n$. The sensors 12-1, 12-2, ... and 12-$n$ may be sequentially connected to the integrator 15 by an operation of the plurality of switches 14-1, 14-2, ... and 14-$n$. Thus, the capacitance values of the sensors 12-1, 12-2, ... and 12-$n$ may be sequentially sensed using a single integrator (i.e., the integrator 15).

The first switch 14-1 may be turned on to apply the a first read voltage Vread corresponding to the first capacitance value C1 of the first sensor 12-1 to the negative input terminal of the operational amplifier, and the reference voltage Vref may be applied to the positive input terminal of the operational amplifier. In such a case, the integrator 15 may output a first output signal corresponding to the first capacitance value C1 as the output voltage signal Vout. Subsequently, the second switch 14-2 may be turned on so that the integrator 15 outputs a second output signal corresponding to the second capacitance value C2 as the output voltage signal Vout. As such, if the integrator 15 sequentially sense the first to $n^{th}$ capacitance values C1, C2, ... and Cn of the sensors 12-1, 12-2, ... and 12-n, a total sensing time of the sensing device 10 may increase.

An operation (i.e., a sampling operation) of selectively sensing the first capacitance value C1 of the first sensor 12-1 may be successively performed more than once. That is, a sampling operation of the first sensor 12-1 may be successively and repeatedly performed more than once in order to improve the accuracy of the output voltage signal Vout corresponding to the first capacitance value C1. For example, if the sampling operation of the first sensor 12-1 is successively and repeatedly performed four times, the first switch 14-1 may be turned on to connect the first sensor 12-1 to the integrator 15 during a first period (T1 of FIG. 2) that the four sampling operations are performed, and the reference voltage Vref may be repeatedly applied to the integrator 15 four times during the period T1. In such a case, a final output voltage signal corresponding to the first capacitance value C1 of the first sensor 12-1 may be obtained using four output voltage signals outputted from the integrator 15. As such, if four sampling operations are required to sense a capacitance value of each of the first to $n^{th}$ sensors 12-1, 12-2, ... and 12-n, a total sampling time corresponding to a sum of the first to $n^{th}$ periods T1, T2, ... and Tn may further increase.

A circuit configuration for respectively connecting the plurality of sensors 12-1, 12-2, ... and 12-n to a plurality of integrators may be considered to reduce the total sampling time of the sensing device 10. In such a case, since the same number of integrators as the sensors 12-1, 12-2, ... and 12-n are required, a total size of the sensing device 10 may increase.

The following embodiments may provide sensing devices which are capable of simultaneously sensing capacitance values of a plurality of sensors using a single integrator to reduce a total sampling time (or a total sensing time) of the capacitance values of the plurality of sensors and to reduce a total size of the sensing devices.

Figure 3:
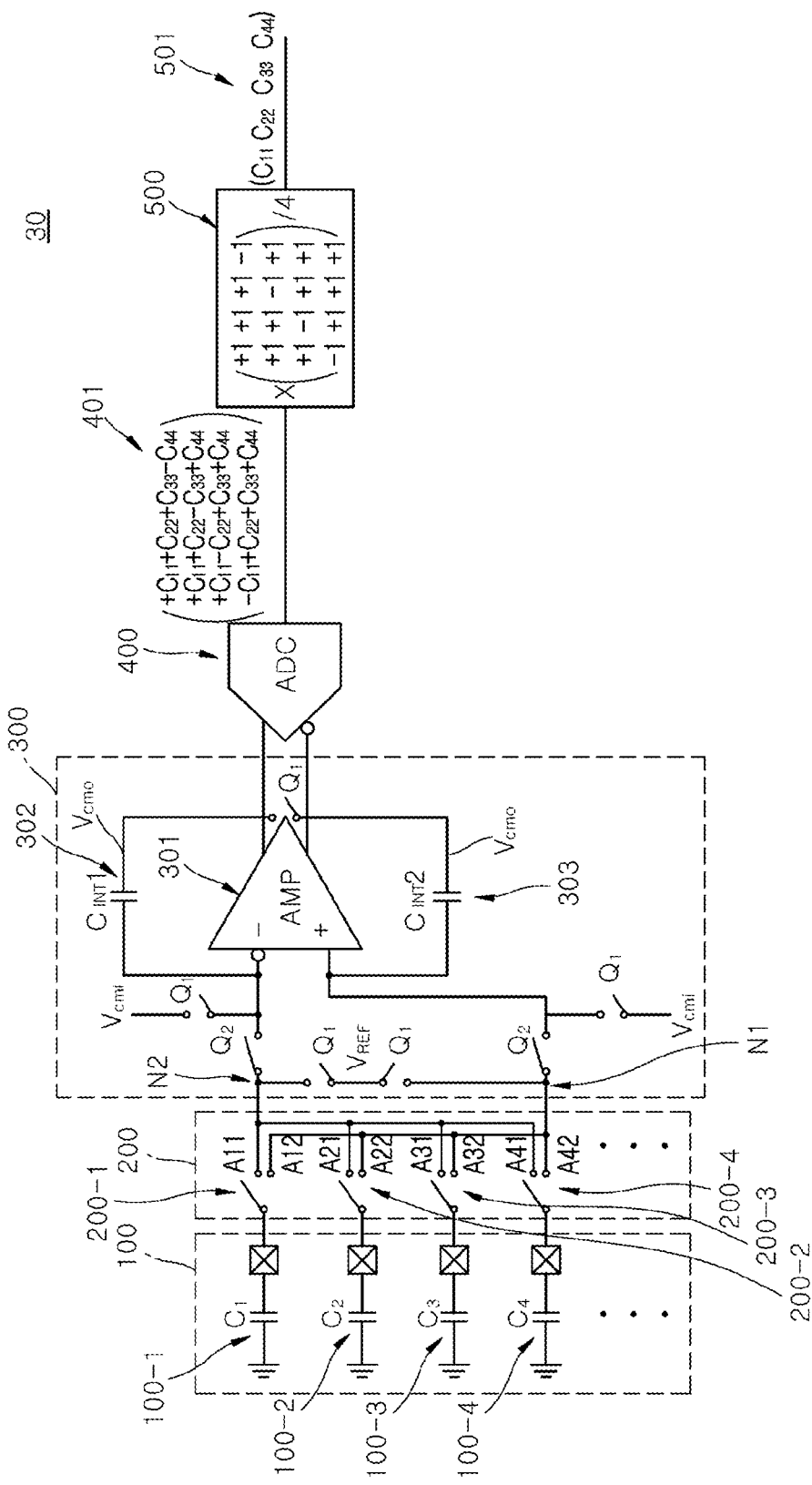
FIG. 3 is a circuit diagram illustrating a sensing device simultaneously sensing a plurality of sensors according to an embodiment.
Figure 4:
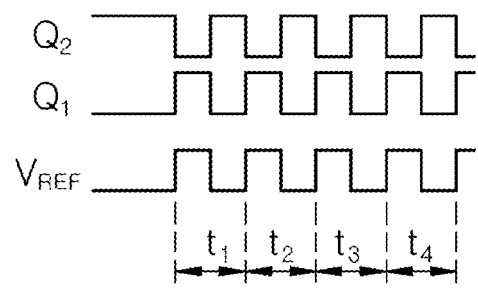
FIG. 4 is a timing diagram illustrating an operation of the sensing device illustrated in FIG. 3.

FIG. 3 is a circuit diagram illustrating a sensing device 30 simultaneously sensing a plurality of sensors according to an embodiment, and FIG. 4 is a timing diagram illustrating an operation of the sensing device 30 illustrated in FIG. 3.

Referring to FIG. 3, the sensing device 30 may include a sensor array portion 100, a switching portion 200, an integrator 300, an analog-to-digital converter (ADC) 400 and a logic circuit 500. The logic circuit 500 may perform an operation of multiplying an orthogonal vector. The sensor array portion 100 may include a plurality of sensors 100-1, 100-2, 100-3, 100-4, . . . . The switching portion 200 may be configured so that capacitance values C1, C2, C3, C4, ... of the sensors 100-1, 100-2, 100-3, 100-4, ... are simultaneously sensed by the integrator 300. The number of the sensors that are simultaneously sensed by the single integrator 300 may be set to be at least three.

Each of the plurality of sensors 100-1, 100-2, 100-3, 100-4, ... constituting the sensor array portion 100 may be configured to include a capacitor having a capacitance value which is variable. The sensor array portion 100 may be comprised of a touch sensor array of a touch recognition device such as a touch screen panel or a touch display panel. Each of the sensors 100-1, 100-2, 100-3, 100-4, ... may be realized using a touch sensor, a capacitance value of which is variable if an input means such as a user's finger or a touch pen is in contact with the sensor.

The capacitors of the sensors 100-1, 100-2, 100-3, 100-4, ... may store their capacitance values, respectively. Although the plurality of sensors 100-1, 100-2, 100-3, 100-4, ... are illustrated as capacitors in FIG. 3, the present disclosure is not limited thereto. For example, in some embodiments, the plurality of sensors 100-1, 100-2, 100-3, 100-4, ... may be realized using other sensors, voltage values or current values of which are variable if an input means such as a user's finger or a touch pen is in contact with the plurality of sensors 100-1, 100-2, 100-3, 100-4, . . . .

The integrator 300 may output an output voltage signal corresponding to variation of a capacitance value of the sensor array portion 100. The integrator 300 may include a circuit that senses the capacitance values C1, C2, C3, C4, ... of the sensors 100-1, 100-2, 100-3, 100-4, . . . . The integrator 300 may include a differential amplifier 301, a first feedback unit 302 and a second feedback unit 303. The first feedback unit 302 constituting a first negative feedback circuit may be realized using a first feedback capacitor that is coupled between a negative input terminal (i.e., a second input terminal) and a positive output terminal of the differential amplifier 301 to have a first internal capacitance value Cint1. The second feedback unit 303 constituting a second negative feedback circuit may be realized using a second feedback capacitor that is coupled between a positive input terminal (i.e., a first input terminal) and a negative output terminal of the differential amplifier 301 to have a second internal capacitance value Cint2.

Two pair of switches Q1 and a pair of switches Q2 may be included in the integrator 300 to control the input of input voltages which are applied to the differential amplifier 301. As illustrated in FIG. 4, the two pair of switches Q1 and the pair of switches Q2 may be alternately turned on according to the reference voltage Vref. That is, the pair of switches Q2 may be turned off while the two pair of switches Q1 are turned on, and the pair of switches Q2 may be turned on while the two pair of switches Q1 are turned off. The two pair of switches Q1 may be turned on to apply the reference voltage Vref to nodes N1 and N2 corresponding to first ends of the pair of switches Q2 and to respectively apply a common mode input voltage Vcmi and a common mode output voltage Vcmo to nodes corresponding to second ends of the pair of switches Q2. The second ends of the pair of switches Q2 may be coupled to the negative input terminal and the positive input terminal of the differential amplifier 301, respectively. The pair of switches Q2 may be turned on to connect the sensors 100-1, 100-2, 100-3, 100-4, ... to the differential amplifier 301. For example, the pair of switches Q2 may be turned on to connect the fourth sensor 100-4 to the positive input terminal of the differential amplifier 301 through the first node N1 and to connect the remaining sensors 100-1, 100-2, 100-3 and 100-5, ... to the negative input terminal of the differential amplifier 301 through the second node N2. Although FIG. 3 illustrates an example in which the at least four sensors 100-1, 100-2, 100-3, 100-4, ... are coupled in parallel, the present disclosure is not limited thereto. For example, in some embodiments, the sensor array portion 100 may include at least three sensors which are alternately coupled to the singe differential amplifier 301.

The switching portion 200 coupled between the sensor array portion 100 and the integrator 300 may include a plurality of switches 200-1, 200-2, 200-3, 200-4, ... to connect any one of the sensors 100-1, 100-2, 100-3, 100-4, ... to the first input terminal (i.e., the positive input terminal) of the differential amplifier 301 and to connect the remaining sensors to the second input terminal (i.e., the negative input terminal) of the differential amplifier 301. In such a case, the remaining sensors may be coupled in parallel to the second input terminal (i.e., the negative input terminal) of the differential amplifier 301.

First ends of the switches 200-1, 200-2, 200-3, 200-4, ... may be coupled to the sensors 100-1, 100-2, 100-3, 100-4, ..., respectively. The terminals A11, A21, A31, A41, ... corresponding to second ends of the switches 200-1, 200-2, 200-3, 200-4, ... may be coupled to the second node N2 which is connected to the negative input terminal of the differential amplifier 301 through one of the pair of switches Q2. That is, all of the terminals A11, A21, A31, A41, ... may be coupled to the second node N2. In addition, the switching portion 200 may also include terminals A12, A22, A32, A42, ..., all of which are coupled to the first node N1. The terminals A12, A22, A32, A42, ... may be disposed to correspond to the terminals A11, A21, A31, A41, ..., respectively. Each of the switches 200-1, 200-2, 200-3, 200-4, ... may operate to be connected to any one of the terminals A11, A21, A31, A41, ... or one of the terminals A12, A22, A32, A42, ....

Referring to FIGS. 3 and 4, the switches 200-1, 200-2, 200-3, 200-4, ... may operate in response to the reference voltage Vref so that only one of the sensors 100-1, 100-2, 100-3, 100-4, ... is connected to the first node N1 and the remaining sensors are connected to the second node N2. For example, the switches 200-1, 200-2, 200-3, 200-4, ... may operate in response to the reference voltage Vref so that the sensors 100-1, 100-2, 100-3, 100-4, ... are sequentially connected to the first node N1 and all of the remaining sensors are connected to the second node N2 while any one of the sensors 100-1, 100-2, 100-3, 100-4, ... is connected to the first node N1.

In case that the sensor array portion 100 has the first to fourth sensors 100-1, 100-2, 100-3 and 100-4 and the switching portion 200 has the first to fourth switches 200-1, 200-2, 200-3 and 200-4, the first to fourth switches 200-1, 200-2, 200-3 and 200-4 may operate so that the fourth switch 200-4 is connected to the terminal A42 which is coupled to the first node N1 and the first to third switches 200-1, 200-2 and 200-3 are respectively connected to the terminals A11, A21 and A31 which are coupled to the second node N2, during a first switching cycle ("t1" of FIG. 4). Thus, a first input voltage corresponding to a sum of the first to third capacitance values C1, C2 and C3 of the first to third sensors 100-1, 100-2 and 100-3 may be inputted to the negative input terminal of the differential amplifier 301, and a second input voltage corresponding to the fourth capacitance value C4 of the fourth sensor 100-4 may be inputted to the positive input terminal of the differential amplifier 301. In such a case, the differential amplifier 301 may output an output voltage that is amplified in proportion to a voltage difference between the first and second input voltages inputted to the differential amplifier 301. That is, the differential amplifier 301 may output an output voltage corresponding to a difference between the sum of the first to third capacitance values C1, C2 and C3 and the fourth capacitance value C4. Accordingly, the output voltage of the differential amplifier 301 may be obtained by simultaneously sensing all of the first to fourth capacitance values C1, C2, C3 and C4 of the first to fourth sensors 100-1, 100-2, 100-3 and 100-4.

The ADC 400 coupled to an output terminal of the integrator 300 may convert an analog signal corresponding to the output voltage of the integrator 300 into a digital signal 401. The logic circuit 500 coupled to an output terminal of the ADC 400 may perform an operation for extracting a plurality of output data 501 corresponding to the first to fourth capacitance values C1, C2, C3 and C4 from the digital signal 401 outputted from the ADC 400. The digital signal 401 outputted from the ADC 400 may be digital data corresponding to a mixed capacitance that includes the components of the first to fourth capacitance values C1, C2, C3 and C4. Thus, an additional operation may be required to obtain various data respectively corresponding to the first to fourth capacitance values C1, C2, C3 and C4 of the first to fourth sensors 100-1, 100-2, 100-3 and 100-4. The logic circuit 500 may perform a logical operation for extracting the output data 501 corresponding to the first to fourth capacitance values C1, C2, C3 and C4 from the digital signal 401 outputted from the ADC 400. The logic circuit 500 may perform a logical operation for multiplying the digital signal 401 by an orthogonal vector.

FIGS. 5 to 8 are circuit diagrams illustrating an example of an operation of the sensing device 30 simultaneously sensing the plurality of sensors 100-1, 100-2, 100-3, 100-4, ... illustrated in FIG. 3. In FIGS. 5 to 8, it is assumed that the plurality of sensors 100-1, 100-2, 100-3, 100-4, ... includes the first to fourth sensors 100-1, 100-2, 100-3 and 100-4. In such a case, the terminals A11, A21, A31 and A41 may correspond to first to fourth terminals, respectively. In addition, the terminals A12, A22, A32 and A42 may correspond to fifth to eighth terminals, respectively. However, the present disclosure may be equally applicable to the embodiments that the sensor array portion 100 is configured to include three, five or more sensors.

Figure 5:
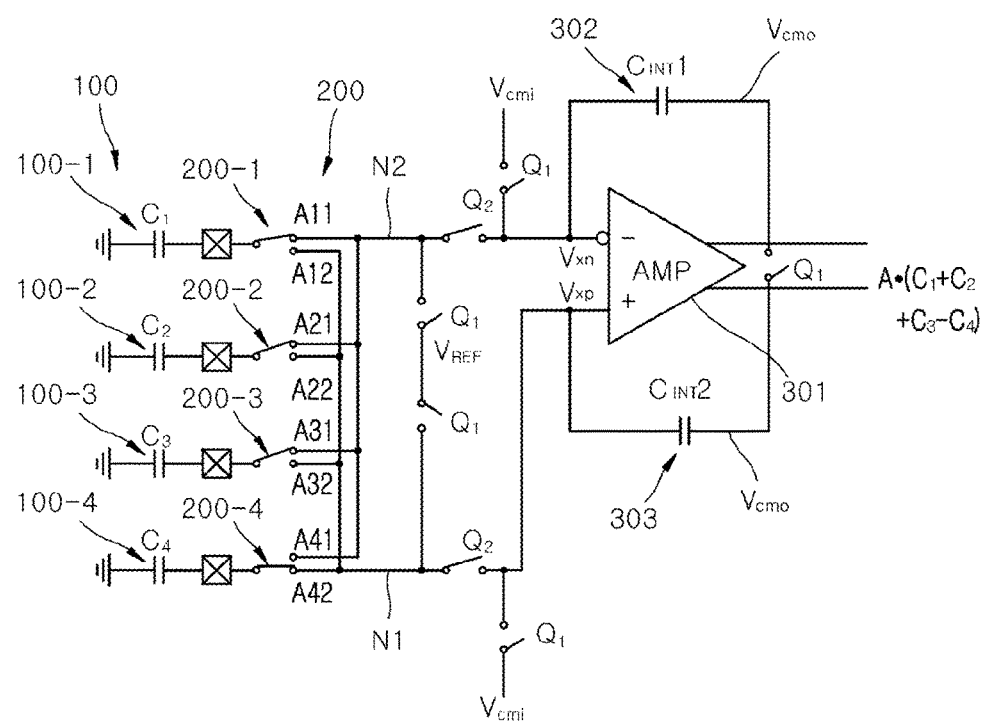
FIGS. 5 to 8 are circuit diagrams illustrating an operation of a sensing device simultaneously sensing a plurality of sensors according to an embodiment.

First, during the first switching cycle ("t1" of FIG. 4), a first switching operation may be performed to respectively connect the first to third switches 200-1, 200-2 and 200-3 to the first to third terminals A11, A21 and A31 and to connect the fourth switch 200-4 to the eighth terminal A42 (see FIG. 5). As illustrated in FIG. 4, the first switching cycle "t1" may be substantially the same as a cycle of the reference voltage Vref signal. During the first switching cycle "t1", the switches Q1 and the switches Q2 may be sequentially turned on, as illustrated in FIG. 4. That is, while the reference voltage Vref signal has a high level of the reference voltage Vref, the switches Q1 may be turned on and the switches Q2 may be turned off. In contrast, while the reference voltage Vref signal has a low level such as a ground voltage, the switches Q1 may be turned off and the switches Q2 may be turned on.

Since the first to third switches 200-1, 200-2 and 200-3 are respectively connected to the first to third terminals A11, A21 and A31, the first to third sensors 100-1, 100-2 and 100-3 coupled to the first to third switches 200-1, 200-2 and 200-3 may be connected to the second node N2. Since the fourth switch 200-4 is connected to the eighth terminal A42, the fourth sensor 100-4 coupled to the fourth switch 200-4 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Since the first to third sensors 100-1, 100-2 and 100-3 are connected in parallel to the second node N2, a voltage corresponding to a sum of the first to third capacitance values C1, C2 and C3 may be induced at the second node N2. In addition, a voltage corresponding to the fourth capacitance value C4 of the fourth sensor 100-4 may be induced at the first node N1.

During the first switching operation, an amount of charges stored at any one of the first and second nodes N1 and N2 may be expressed by any one of the following equations 1, 2, 4 and 4 according to on/off operations of the switches Q1 and the switches Q2. If the switches Q1 are turned on, an amount of charges stored at the second node N2 may be expressed by the following equation 1 and an amount of charges stored at the first node N1 may be expressed by the following equation 2.

$$\Sigma C(1,2,3) \times Vref + Cint1 \times (Vcmi - Vcmo) \quad \text{(Equation 1)}$$

$$C4 \times Vref + Cint2 \times (Vcmi - Vcmo) \quad \text{(Equation 2)}$$

If the switches Q2 are turned on, an amount of charges stored at the second node N2 may be expressed by the following equation 3 and an amount of charges stored at the first node N1 may be expressed by the following equation 4.

$$\Sigma C(1,2,3) \times Vxp + Cint1 \times \{Vxp - (Vcmo + Vod)\} \quad \text{(Equation 3)}$$

$$C4 \times Vxn + Cint2 \times \{Vxn - (Vcmo - Vod)\} \quad \text{(Equation 4)}$$

In the equations 1, 2, 3 and 4, "C1", "C2", "C3" and "C4" denote capacitance values of the sensors 100-1, 100-2, 100-3 and 100-4, respectively, "Cint1" denotes a first internal capacitance value corresponding to a capacitance value of the first feedback unit 302, "Cint2" denotes a second internal capacitance value corresponding to a capacitance value of the second feedback unit 303, "Vref" denotes a reference voltage, "Vcmi" denotes a common mode input voltage, "Vcmo" denotes a common mode output voltage, "Vxn" denotes a voltage inputted to the negative input terminal of the differential amplifier 301, "Vxp" denotes a voltage inputted to the positive input terminal of the differential amplifier 301, and "Vod" denotes an output drive voltage.

Since the amount of charges at the same node has to be preserved, the equation 1 may be equal to the equation 3 and the equation 2 may be equal to the equation 4. If the first and second internal capacitance values Cint1 and Cint2 have the same capacitance value of Cint, an amount of charges stored at the second node N2 may be expressed by the following equation 5 and an amount of charges stored at the first node N1 may be expressed by the following equation 6.

$$\Sigma C(1,2,3) \times Vref + Cint \times (Vcmi - Vcmo) = \Sigma C(1,2,3) \times Vxp + Cint \times \{Vxp - (Vcmo + Vod)\} \quad \text{(Equation 5)}$$

$$C4 \times Vref + Cint \times (Vcmi - Vcmo) = C4 \times Vxn + Cint \times \{Vxn - (Vcmo - Vod)\} \quad \text{(Equation 6)}$$

Ideally, the differential amplifier 301 may be designed to have the voltage Vxn and the voltage Vxp which are equal to each other. In such a case, the output drive voltage Vod of the differential amplifier 301 may be calculated by the following equation 7 which is extracted from the equations 5 and 6.

$$Vod = (Vref - Vxp,xn) \times (C1 + C2 + C3 - C4)/2 \times Cint = A \times (C1 + C2 + C3 - C4) \quad \text{(Equation 7)}$$

In the equation 7, "A" denotes a constant value.

As can be seen from the equation 7, if the first to third sensors 100-1, 100-2 and 100-3 are connected in parallel to the negative input terminal of the differential amplifier 301 by the first to third switches 200-1, 200-2 and 200-3 and the fourth sensor 100-4 is connected to the positive input terminal of the differential amplifier 301 by the fourth switch 200-4, the differential amplifier 301 may output the output drive voltage Vod which is proportional to a value of "C1+C2+C3−C4". That is, if the first to third capacitance values C1, C2 and C3 of the first to third sensors 100-1, 100-2 and 100-3 connected to the negative input terminal of the differential amplifier 301 and the fourth capacitance value C4 of the fourth sensor 100-4 connected to the positive input terminal of the differential amplifier 301 are simultaneously sensed by the differential amplifier 301, the output drive voltage Vod may be proportional to the value of "C1+C2+C3−C4".

Figure 6:
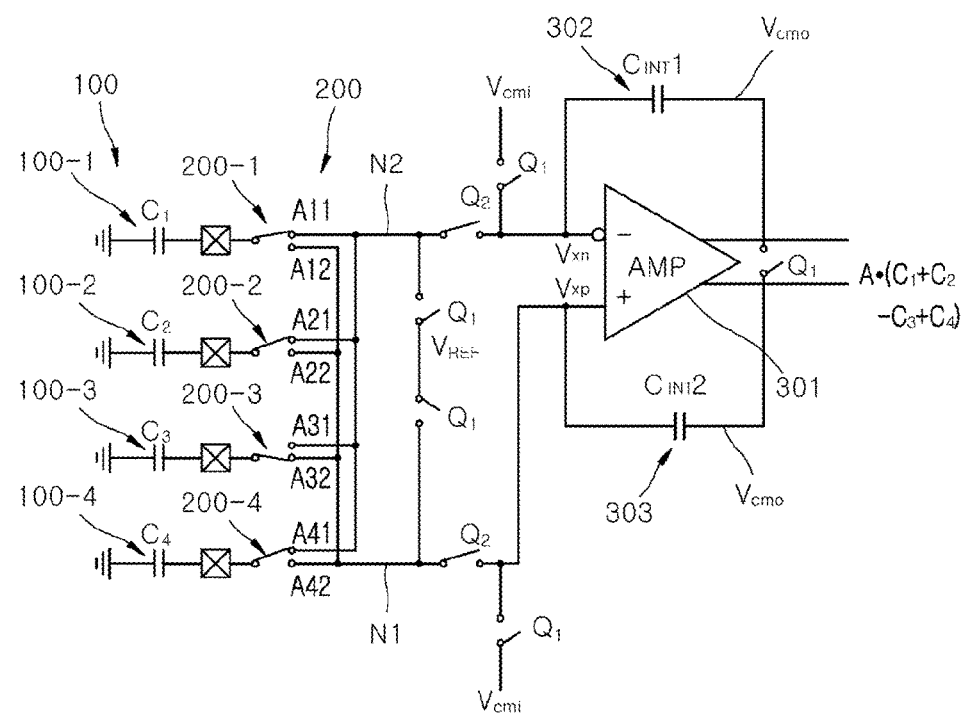

Referring to FIG. 6, during a second switching cycle ("t2" of FIG. 4), a second switching operation may be performed to respectively connect the first, second and fourth switches 200-1, 200-2 and 200-4 to the first, second and fourth terminals A11, A21 and A41 and to connect the third switch 200-3 to the seventh terminal A32. As illustrated in FIG. 4, the second switching cycle "t2" may also be substantially the same as a cycle of the reference voltage Vref signal. During the second switching cycle "t2", the switches Q1 and the switches Q2 may be sequentially turned on, as illustrated in FIG. 4. That is, while the reference voltage Vref signal has a high level of the reference voltage Vref, the switches Q1 may be turned on and the switches Q2 may be turned off. In contrast, while the reference voltage Vref signal has a low level such as a ground voltage, the switches Q1 may be turned off and the switches Q2 may be turned on.

Since the first, second and fourth switches 200-1, 200-2 and 200-4 are respectively connected to the first, second and fourth terminals A11, A21 and A41, the first, second and fourth sensors 100-1, 100-2 and 100-4 coupled to the first, second and fourth switches 200-1, 200-2 and 200-4 may be connected to the second node N2. Since the third switch 200-3 is connected to the seventh terminal A32, the third sensor 100-3 coupled to the third switch 200-3 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Thus, the first, second and fourth sensors 100-1, 100-2 and 100-4 having the first, second and fourth capacitance values C1, C2 and C4 may be connected in parallel to the second node N2. In addition, the third sensor 100-3 having the third capacitance value C3 may be connected to the first node N1.

If the first, second and fourth sensors 100-1, 100-2 and 100-4 are connected in parallel to the negative input terminal of the differential amplifier 301 by the first, second and fourth switches 200-1, 200-2 and 200-4 and the third sensor 100-3 is connected to the positive input terminal of the differential amplifier 301 by the third switch 200-3, the output drive voltage Vod may be calculated by an equation of "A×(C1+C2−C3+C4)" which is extracted from the equations 1 to 7. That is, the output drive voltage Vod may be proportional to the value of "C1+C2−C3+C4".

Figure 7:
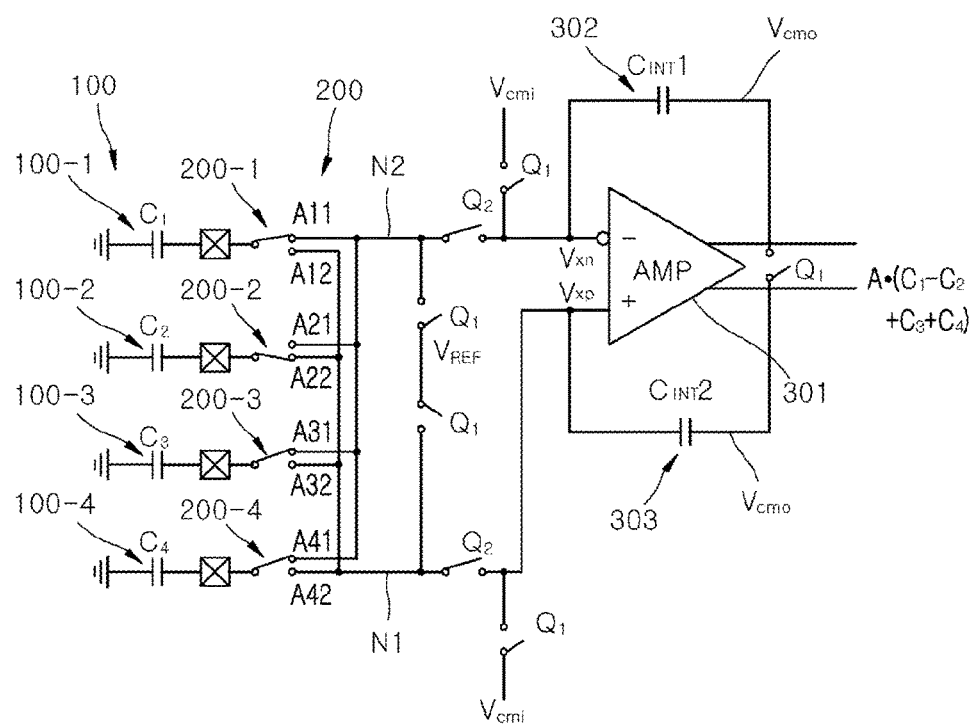

Referring to FIG. 7, during a third switching cycle ("t3" of FIG. 4), a third switching operation may be performed to respectively connect the first, third and fourth switches 200-1, 200-3 and 200-4 to the first, third and fourth terminals A11, A31 and A41 and to connect the second switch 200-2 to the sixth terminal A22. As illustrated in FIG. 4, the third switching cycle "t3" may also be substantially the same as a cycle of the reference voltage Vref signal. During the third switching cycle "t3", the switches Q1 and the switches Q2 may be sequentially turned on, as illustrated in FIG. 4. That is, while the reference voltage Vref signal has a high level of the reference voltage Vref, the switches Q1 may be turned on and the switches Q2 may be turned off. In contrast, while the reference voltage Vref signal has a low level such as a ground voltage, the switches Q1 may be turned off and the switches Q2 may be turned on.

Since the first, third and fourth switches 200-1, 200-3 and 200-4 are respectively connected to the first, third and fourth terminals A11, A31 and A41, the first, third and fourth sensors 100-1, 100-3 and 100-4 coupled to the first, third and fourth switches 200-1, 200-3 and 200-4 may be connected to the second node N2. Since the second switch 200-2 is connected to the sixth terminal A22, the second sensor 100-2 coupled to the second switch 200-2 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Thus, the first, third and fourth sensors 100-1, 100-3 and 100-4 having the first, third and fourth capacitance values C1, C3 and C4 may be connected in parallel to the second node N2. In addition, the second sensor 100-2 having the second capacitance value C2 may be connected to the first node N1.

If the first, third and fourth sensors 100-1, 100-3 and 100-4 are connected in parallel to the negative input terminal of the differential amplifier 301 by the first, third and fourth switches 200-1, 200-3 and 200-4 and the second sensor 100-2 is connected to the positive input terminal of the differential amplifier 301 by the second switch 200-2, the output drive voltage Vod may be calculated by an equation of "A×(C1−C2+C3+C4)" which is extracted from the equations 1 to 7. That is, the output drive voltage Vod may be proportional to the value of "C1−C2+C3+C4".

Figure 8:
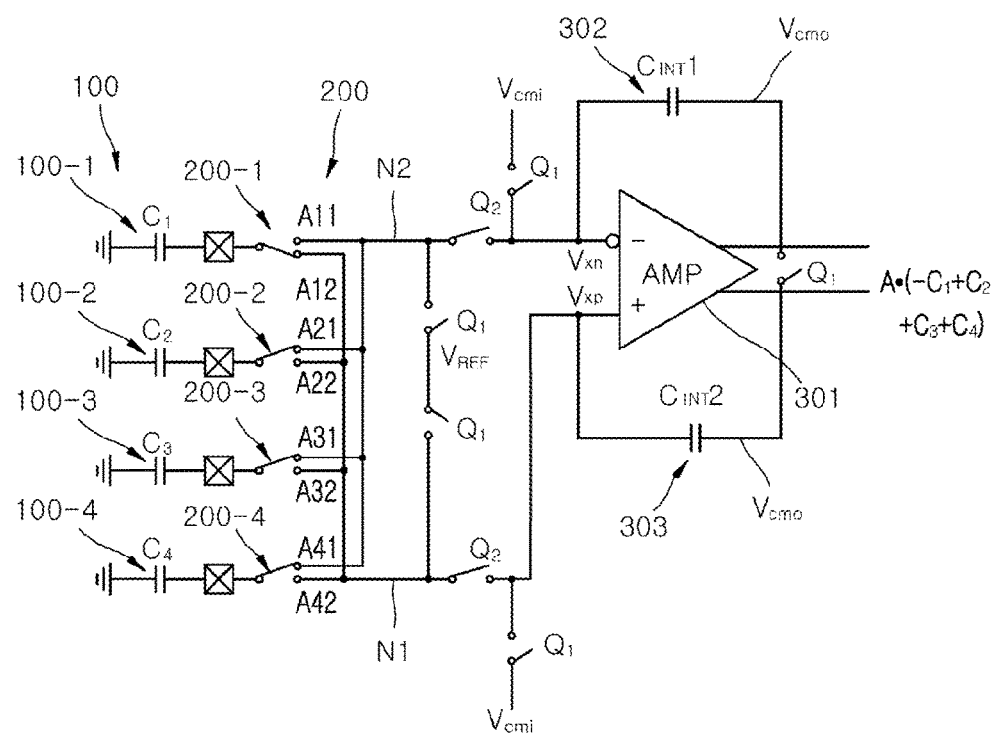

Referring to FIG. 8, during a fourth switching cycle ("t4" of FIG. 4), a fourth switching operation may be performed to respectively connect the second, third and fourth switches 200-2, 200-3 and 200-4 to the second, third and fourth terminals A21, A31 and A41 and to connect the first switch 200-1 to the fifth terminal A12. As illustrated in FIG. 4, the fourth switching cycle "t4" may also be substantially the same as a cycle of the reference voltage Vref signal. During the fourth switching cycle "t4", the switches Q1 and the switches Q2 may be sequentially turned on, as illustrated in FIG. 4. That is, while the reference voltage Vref signal has a high level of the reference voltage Vref, the switches Q1 may be turned on and the switches Q2 may be turned off. In contrast, while the reference voltage Vref signal has a low level such as a ground voltage, the switches Q1 may be turned off and the switches Q2 may be turned on.

Since the second, third and fourth switches 200-2, 200-3 and 200-4 are respectively connected to the second, third and fourth terminals A21, A31 and A41, the second, third and fourth sensors 100-2, 100-3 and 100-4 coupled to the second, third and fourth switches 200-2, 200-3 and 200-4 may be connected to the second node N2. Since the first switch 200-1 is connected to the fifth terminal A12, the first sensor 100-1 coupled to the second switch 200-2 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Thus, the second, third and fourth sensors 100-2, 100-3 and 100-4 having the second, third and fourth capacitance values C2, C3 and C4 may be connected in parallel to the second node N2. In addition, the first sensor 100-1 having the first capacitance value C1 may be connected to the first node N1.

If the second, third and fourth sensors 100-2, 100-3 and 100-4 are connected in parallel to the negative input terminal of the differential amplifier 301 by the second, third and fourth switches 200-2, 200-3 and 200-4 and the first sensor 100-1 is connected to the positive input terminal of the differential amplifier 301 by the first switch 200-1, the output drive voltage Vod may be calculated by an equation of "A×(−C1+C2+C3+C4)" which is extracted from the equations 1 to 7. That is, the output drive voltage Vod may be proportional to the value of "−C1+C2+C3+C4".

As described with reference to FIGS. 5 to 8, the fourth, third, second and first sensors 100-4, 100-3, 100-2 and 100-1 may be sequentially connected to the positive input terminal of the differential amplifier 301 during the first to fourth switching cycles "t1", "t2", "t3" and "t4", respectively. Thus, the differential amplifier 301 may output an output signal having a voltage level corresponding to a capacitance value that remains after subtracting one of the first to fourth capacitance values C1~C4 from a sum of the three remaining capacitance values during each switching cycle. That is, output signals corresponding to the values of "A(C1+C2+C3−C4)", "A(C1+C2−C3+C4)", "A(C1−C2+C3+C4)" and "A(−C1+C2+C3+C4)" may be sequentially outputted from the differential amplifier 301 during the first to fourth switching cycles "t1", "t2", "t3" and "t4". Each output signal of the differential amplifier 301 may include components of the first to fourth capacitance values C1~C4. Thus, it may be necessary to extract output data corresponding to components of the first to fourth capacitance values C1~C4 from the output signals of the differential amplifier 301.

As described with reference to FIG. 3, the analog signal (i.e., the output signal) outputted from the differential amplifier 301 may be converted into the digital signal 401 by the ADC 400. The digital signals 401 outputted from the ADC 400 during the first to fourth switching cycles "t1", "t2", "t3" and "t4" may be expressed as digital data of "(+C11+C22+C33−C44)", "(+C11+C22−C33+C44)", "(+C11−C22+C33+C44)" and "(−C11+C22+C33+C44)", respectively. The digital data of "(+C11+C22+C33−C44)", "(+C11+C22−C33+C44)", "(+C11−C22+C33+C44)" and "(−C11+C22+C33+C44)" may be obtained by converting the analog data of "A(+C1+C2+C3−C4)", "A(+C1+C2−C3+C4)", "A(+C1−C2+C3+C4)" and "A(−C1+C2+C3+C4)" outputted from the integrator 300 into digital data. Each of the digital signals 401 may include components C11, C22, C33 and C44 corresponding to the first to fourth capacitance values C1, C2, C3 and C4. Each of the digital signals 401 may be generated whenever the first to fourth capacitance values C1~C4 are sensed once. That is, each of the digital signals 401 may be generated by sensing the first to fourth capacitance values C1~C4 once during each switching cycle "t1", "t2", "t3" or "t4".

The components C11, C22, C33 and C44 of the digital signals 401 corresponding to the first to fourth capacitance values C1~C4 may be extracted from the digital signals 401 by the logic circuit 500. The logic circuit 500 may perform an operation for extracting the components C11, C22, C33 and C44 from the digital signals 401 to generate the output data 501 corresponding to the first to fourth capacitance values C1~C4.

Digital data corresponding to the digital signals 401 outputted from the ADC 400 may be expressed by the following equation 8 having a matrix form and may be inputted to the logic circuit 500. A matrix Md of the equation 8 may be a column vector having elements of "(+C11+C22+C33−C44)", "(+C11+C22−C33+C44)", "(+C11−C22+C33+C44)" and "(−C11+C22+C33+C44)".

$$M_d \begin{pmatrix} +C_{11}+C_{22}+C_{33}-C_{44} \\ +C_{11}+C_{22}-C_{33}+C_{44} \\ +C_{11}-C_{22}+C_{33}+C_{44} \\ -C_{11}+C_{22}+C_{33}+C_{44} \end{pmatrix}$$

(Equation 8)

In order to extract the components C11, C22, C33 and C44 corresponding to the first to fourth capacitance values C1~C4 from the equation 8, the logic circuit 500 may use timing data of operations of the switches 200-1, 200-2, 200-3 and 200-4 included in the switching portion 200. As described with reference to FIGS. 5 to 8, capacitance values inputted to the differential amplifier 301 of the integrator 300 may vary according to on/off states of the switches 200-1, 200-2, 200-3 and 200-4. Thus, the capacitance values inputted to the differential amplifier 301 according to on/off states of the switches 200-1, 200-2, 200-3 and 200-4 may be expressed by the following equation 9.

$$(C_1\ C_2\ C_3\ C_4) \cdot \begin{pmatrix} +1\ +1\ +1\ -1 \\ +1\ +1\ -1\ +1 \\ +1\ -1\ +1\ +1 \\ -1\ +1\ +1\ +1 \end{pmatrix} = \begin{pmatrix} C_1+C_2+C_3-C_4 \\ C_1+C_2-C_3+C_4 \\ C_1+C_2+C_3+C_4 \\ -C_1+C_2+C_3+C_4 \end{pmatrix}$$

(Equation 9)

Mo      Ms      Mi

Figure 9:
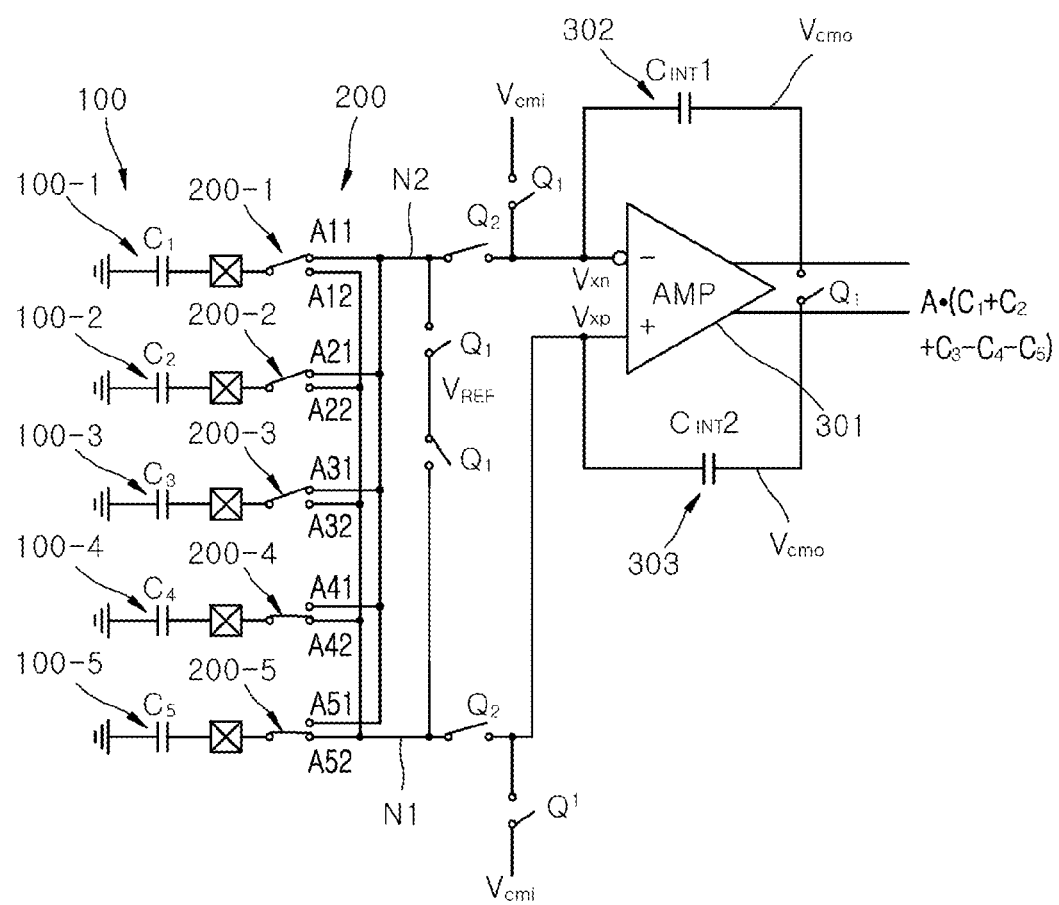
FIGS. 9 to 13 are circuit diagrams illustrating an operation of a sensing device simultaneously sensing a plurality of sensors according to an embodiment.

In the equation 9, the matrix "Mo" denotes a row vector employing the first to fourth capacitance values "C1", "C2", "C3" and "C4" as elements, and the matrix "Ms" denotes a square matrix employing switching states of the switches 200-1, 200-2, 200-3 and 200-4 as elements. The capacitance values inputted to the differential amplifier 301 according to on/off states of the switches 200-1, 200-2, 200-3 and 200-4 may be expressed by the matrix "Mi" corresponding to a result of an operation of multiplying the matrix "Mo" by the matrix "Ms", as illustrated in FIG. 9. The analog data of "A(+C1+C2+C3−C4)", "A(+C1+C2−C3+C4)", "A(+C1−C2+C3+C4)" and "A(−C1+C2+C3+C4)" outputted from the differential amplifier 301 may be expressed by a matrix of "A×Mi".

If the switches 200-1, 200-2, 200-3 and 200-4 are connected to the positive input terminal of the differential amplifier 301 through the first node N1, the switching states of the switches 200-1, 200-2, 200-3 and 200-4 may be denoted by a negative numeral of "−1" in the matrix "Ms". If the switches 200-1, 200-2, 200-3 and 200-4 are connected to the negative input terminal of the differential amplifier 301 through the second node N2, the switching states of the switches 200-1, 200-2, 200-3 and 200-4 may be denoted by a positive numeral of "+1" in the matrix "Ms". In such a case, switching data corresponding to the switching states of the switches 200-1, 200-2, 200-3 and 200-4 during the first to fourth switching operations may be expressed by the matrix "Ms" illustrated in the equation 9. The matrix "Ms" illustrated in the equation 9 may be substantially identical to a coefficient matrix of the matrix "Md" illustrated in the equation 8.

The logic circuit 500 may generate an inverse matrix "Ms$^{-1}$" of the matrix "Ms" and may perform an operation of multiplying the digital data 401 by the inverse matrix "Ms$^{-1}$" to extract the components C11, C22, C33 and C44 corresponding to the first to fourth capacitance values C1~C4. Alternatively, the logic circuit 500 may generate an orthogonal matrix "Ms$^T$" of the matrix "Ms" and may perform an operation of multiplying the digital data 401 by the orthogonal matrix "Ms$^T$" to extract the components C11, C22, C33 and C44 corresponding to the first to fourth capacitance values C1~C4.

An equation 10 may be obtained from the equation 9 and may be expressed as follows.

$$(C_1\ C_2\ C_3\ C_4) \cdot \begin{pmatrix} +1\ +1\ +1\ -1 \\ +1\ +1\ -1\ +1 \\ +1\ -1\ +1\ +1 \\ -1\ +1\ +1\ +1 \end{pmatrix} \begin{pmatrix} +1\ +1\ +1\ -1 \\ +1\ +1\ -1\ +1 \\ +1\ -1\ +1\ +1 \\ -1\ +1\ +1\ +1 \end{pmatrix}_{/4} =$$

Mo      Ms      Ms$^{-1}$ $$\begin{pmatrix} C_1+C_2+C_3-C_4 \\ C_1+C_2-C_3+C_4 \\ C_1-C_2+C_3+C_4 \\ -C_1+C_2+C_3+C_4 \end{pmatrix} \begin{pmatrix} +1\ +1\ +1\ -1 \\ +1\ +1\ -1\ +1 \\ +1\ -1\ +1\ +1 \\ -1\ +1\ +1\ +1 \end{pmatrix}_{/4} = (C_1\ C_2\ C_3\ C_4)$$

Mi      Ms$^{-1}$ (Equation 10)

According to the equation 10, if the matrix "Mi" expressing the capacitance values inputted to the differential amplifier 301 is multiplied by the inverse matrix "Ms$^{-1}$" of the matrix "Ms", the matrix "Mo" of the first to fourth capacitance values C1~C4 may be obtained. Since a unit matrix "I" is obtained by multiplying an arbitrary matrix by an inverse matrix of the arbitrary matrix, the product of the matrix "Ms" and the matrix "Ms$^{-1}$" may produce a unit matrix "I". In addition, since the product of an arbitrary matrix and a unit matrix produces the arbitrary matrix, the equation 10 may be obtained. That is, if the output data of the differential amplifier 301 are multiplied by the inverse matrix "Ms$^{-1}$" of the matrix "Ms", a matrix of "(C1, C2, C3, C4)" may be obtained.

If the switching data matrix "Ms" has a symmetric matrix form as illustrated in the equations 9 and 10, the product of the switching data matrix "Ms" and the orthogonal matrix "Ms$^T$" of the matrix "Ms" may produce a unit matrix. Since the orthogonal matrix "Ms$^T$" is identical to the inverse matrix "Ms$^{-1}$", the product of the switching data matrix "Ms" and the orthogonal matrix "Ms$^T$" may also produce a unit matrix. Thus, the capacitance matrix "(C1, C2, C3, C4)" may be extracted by multiplying the output data of the differential amplifier 301 by the orthogonal matrix "$Ms^T$". Since the output data of the differential amplifier 301 are analog data, the above operation using the digital data 401 outputted from the ADC 400 may be performed by the logic circuit 500.

The digital data 501 including the capacitance components C11, C22, C33 and C44 may be extracted using the equation 10 and the following equation 11.

(Equation 11)

$$\underbrace{\begin{pmatrix} +C_{11}+C_{22}+C_{33}-C_{44} \\ +C_{11}+C_{22}-C_{33}+C_{44} \\ +C_{11}-C_{22}+C_{33}+C_{44} \\ -C_{11}+C_{22}+C_{33}+C_{44} \end{pmatrix}}_{Md} \underbrace{\begin{pmatrix} +1 +1 +1 -1 \\ +1 +1 -1 +1 \\ +1 -1 +1 +1 \\ -1 +1 +1 +1 \end{pmatrix}}_{Ms^{-1}} = \underbrace{(C_{11}\ C_{22}\ C_{33}\ C_{44})}_{501}$$

As described with reference to the equation 8, the output digital data 401 may include data that are obtained by sensing all of the first to fourth capacitance values C1, C2, C3 and C4 four times. Thus, the digital data 501 corresponding to the first to fourth capacitance values C1, C2, C3 and C4 may be obtained as a matrix form of "(C11, C22, C33, C44) by operations of the logic circuit 500.

The digital data 501 may correspond to average values of data that are obtained by sensing the first to fourth capacitance values C1, C2, C3 and C4 four times. In such a case, the first to fourth capacitance values C1, C2, C3 and C4 may be simultaneously sensed each time. Thus, according to the embodiments illustrated in FIGS. 5 to 8, a total sensing time may be reduced to one fourth as compared with an embodiment illustrated in FIGS. 1 and 2. In addition, since all of the first to fourth capacitance values C1, C2, C3 and C4 are sensed four times, each of the first to fourth capacitance values C1, C2, C3 and C4 may be sensed four times.

FIGS. 9 to 13 are circuit diagrams illustrating other examples of an operation of the sensing device 30 simultaneously sensing the plurality of sensors 100-1, 100-2, 100-3, 100-4, . . . illustrated in FIG. 3. In FIGS. 9 to 13, it is assumed that the plurality of sensors includes the first to fifth sensors 100-1, 100-2, 100-3, 100-4 and 100-5. In such a case, the terminals A11, A21, A31, A41 and A51 may correspond to first to fifth terminals, respectively. In addition, the terminals A12, A22, A32, A42 and A52 may correspond to sixth to tenth terminals, respectively. Moreover, it is assumed that the switching portion 200 includes first to fifth switches 200-1, 200-2, 200-3, 200-4 and 200-5 corresponding to the first to fifth sensors 100-1, 100-2, 100-3, 100-4 and 100-5. However, the present disclosure may be equally applicable to the embodiments that the sensor array portion 100 is configured to include six or more sensors.

In an embodiment, the first to fifth switches 200-1, 200-2, 200-3, 200-4 and 200-5 may operate so that two of the first to fifth switches 200-1, 200-2, 200-3, 200-4 and 200-5 are selectively coupled to the positive input terminal (i.e., the first input terminal) of the differential amplifier 301 and the remaining switches of the first to fifth switches 200-1, 200-2, 200-3, 200-4 and 200-5 are coupled to the negative input terminal (i.e., the second input terminal) of the differential amplifier 301. This switching operation may be successively performed so that the two sensors coupled to the positive input terminal of the differential amplifier 301 change five times for five switching cycles.

First, during a first switching cycle, a first switching operation may be performed to respectively connect the first to third switches 200-1, 200-2 and 200-3 to the first to third terminals A11, A21 and A31 and to respectively connect the fourth and fifth switches 200-4 and 200-5 to the ninth and tenth terminals A42 and A52 (see FIG. 9). Since the first to third switches 200-1, 200-2 and 200-3 are respectively connected to the first to third terminals A11, A21 and A31, the first to third sensors 100-1, 100-2 and 100-3 coupled to the first to third switches 200-1, 200-2 and 200-3 may be connected to the second node N2. Since the fourth switch 200-4 is connected to the ninth terminal A42 and the fifth switch 200-5 is connected to the tenth terminal A52, the fourth sensor 100-4 coupled to the fourth switch 200-4 and the fifth sensor 100-5 coupled to the fifth switch 200-5 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Since the first to third sensors 100-1, 100-2 and 100-3 are connected in parallel to the second node N2, a voltage corresponding to a sum of the first to third capacitance values C1, C2 and C3 may be induced at the second node N2. In addition, a voltage corresponding to a sum of the fourth and fifth capacitance values C4 and C5 may be induced at the first node N1.

Considering the equation 7, if the first to third sensors 100-1, 100-2 and 100-3 are connected to the negative input terminal of the differential amplifier 301 through the first to third switches 200-1, 200-2 and 200-3 and the fourth and fifth sensors 100-4 and 100-5 are connected to the negative input terminal of the differential amplifier 301 through the fourth and fifth switches 200-4 and 200-5, the differential amplifier 301 may output the output drive voltage Vod which is proportional to a value of "C1+C2+C3−C4−C5". That is, if the first to third capacitance values C1, C2 and C3 of the first to third sensors 100-1, 100-2 and 100-3 connected to the negative input terminal of the differential amplifier 301 and the fourth and fifth capacitance values C4 and C5 of the fourth and fifth sensors 100-4 and 100-5 connected to the positive input terminal of the differential amplifier 301 are simultaneously sensed by the differential amplifier 301, the output drive voltage Vod may be proportional to the value of "C1+C2+C3−C4−C5".

Figure 10:
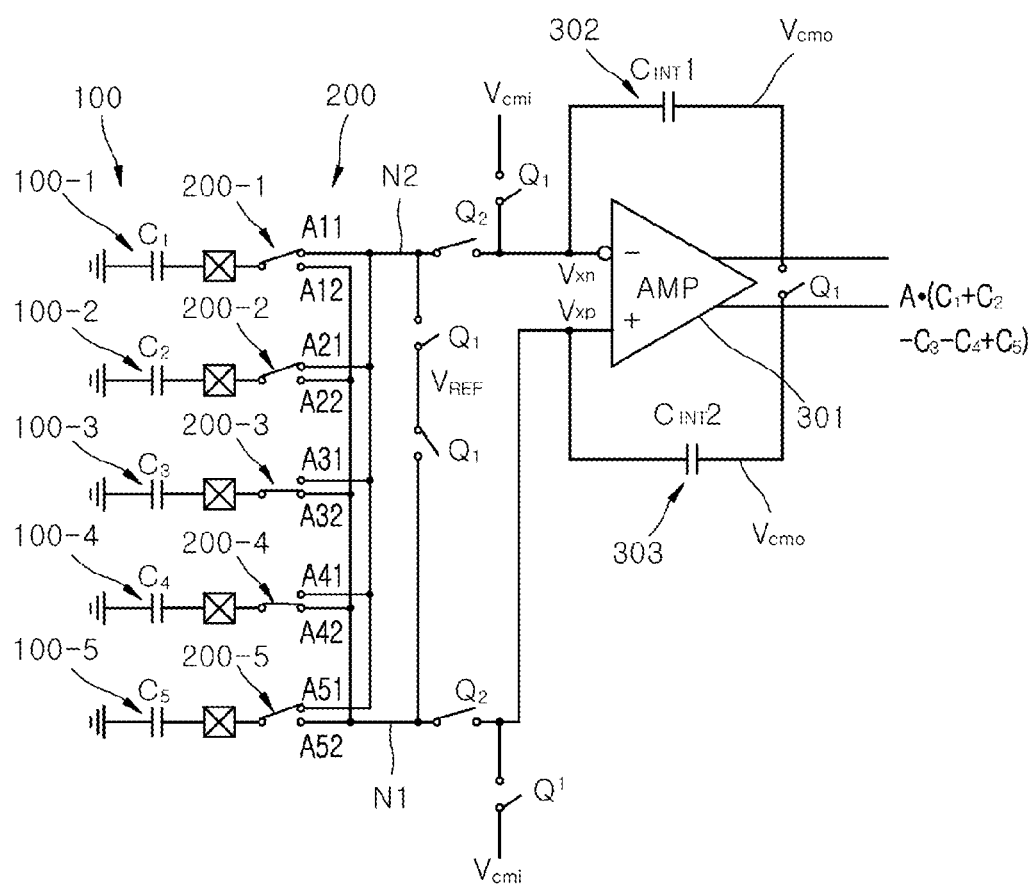

Referring to FIG. 10, during a second switching cycle, a second switching operation may be performed to respectively connect the first, second and fifth switches 200-1, 200-2 and 200-5 to the first, second and fifth terminals A11, A21 and A41 and to respectively connect the third and fourth switches 200-3 and 200-4 to the eighth and ninth terminals A32 and A42. Since the first, second and fifth switches 200-1, 200-2 and 200-5 are respectively connected to the first, second and fifth terminals A11, A21 and A51, the first, second and fifth sensors 100-1, 100-2 and 100-5 coupled to the first, second and fifth switches 200-1, 200-2 and 200-5 may be connected to the second node N2. Since the third and fourth switches 200-3 and 200-4 are connected to the eighth and ninth terminals A32 and A42, the third and fourth sensors 100-3 and 100-4 coupled to the third and fourth switches 200-3 and 200-4 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Thus, the first, second and fifth sensors 100-1, 100-2 and 100-5 having the first, second and fifth capacitance values C1, C2 and C5 may be connected in parallel to the second node N2. In addition, the third and fourth sensors 100-3 and 100-4 having the third and fourth capacitance values C3 and C4 may be connected in parallel to the first node N1.

Considering the equations 1 to 7, the output drive voltage Vod may be calculated by an equation of "A×(C1+C2−C3−C4+C5)".

Figure 11:
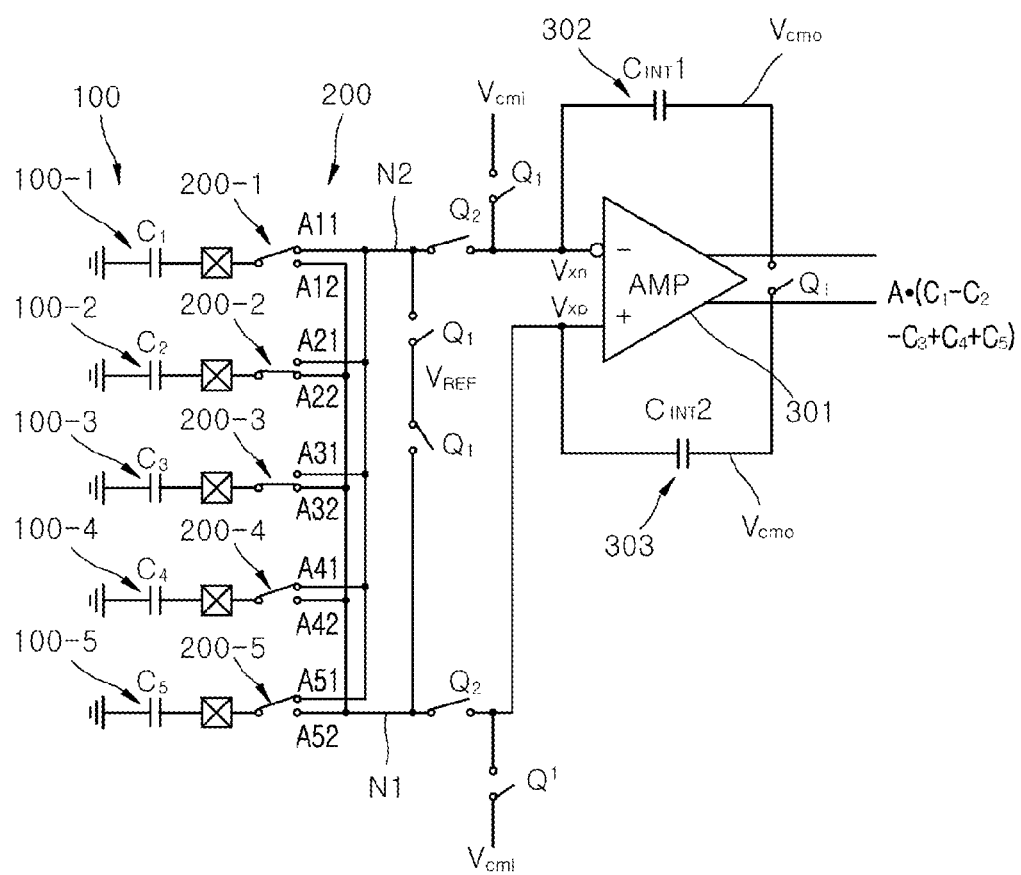

Referring to FIG. 11, during a third switching cycle, a third switching operation may be performed to respectively connect the first, fourth and fifth switches 200-1, 200-4 and 200-5 to the first, fourth and fifth terminals A11, A41 and A51 and to respectively connect the second and third switches 200-2 and 200-3 to the seventh and eighth terminals A22 and A32. Since the first, fourth and fifth switches 200-1, 200-4 and 200-5 are respectively connected to the first, fourth and fifth terminals A11, A41 and A51, the first, fourth and fifth sensors 100-1, 100-4 and 100-5 coupled to the first, fourth and fifth switches 200-1, 200-4 and 200-5 may be connected to the second node N2. Since the second and third switches 200-2 and 200-3 are respectively connected to the seventh and eighth terminals A22 and A32, the second and third sensors 100-2 and 100-3 coupled to the second and third switches 200-2 and 200-3 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Thus, the first, fourth and fifth sensors 100-1, 100-4 and 100-5 having the first, fourth and fifth capacitance values C1, C4 and C5 may be connected in parallel to the second node N2. In addition, the second and third sensors 100-2 and 100-3 having the second and third capacitance values C2 and C3 may be connected in parallel to the first node N1. Considering the equations 1 to 7, the output drive voltage Vod may be calculated by an equation of "A×(C1−C2−C3+C4+C5)".

Figure 12:
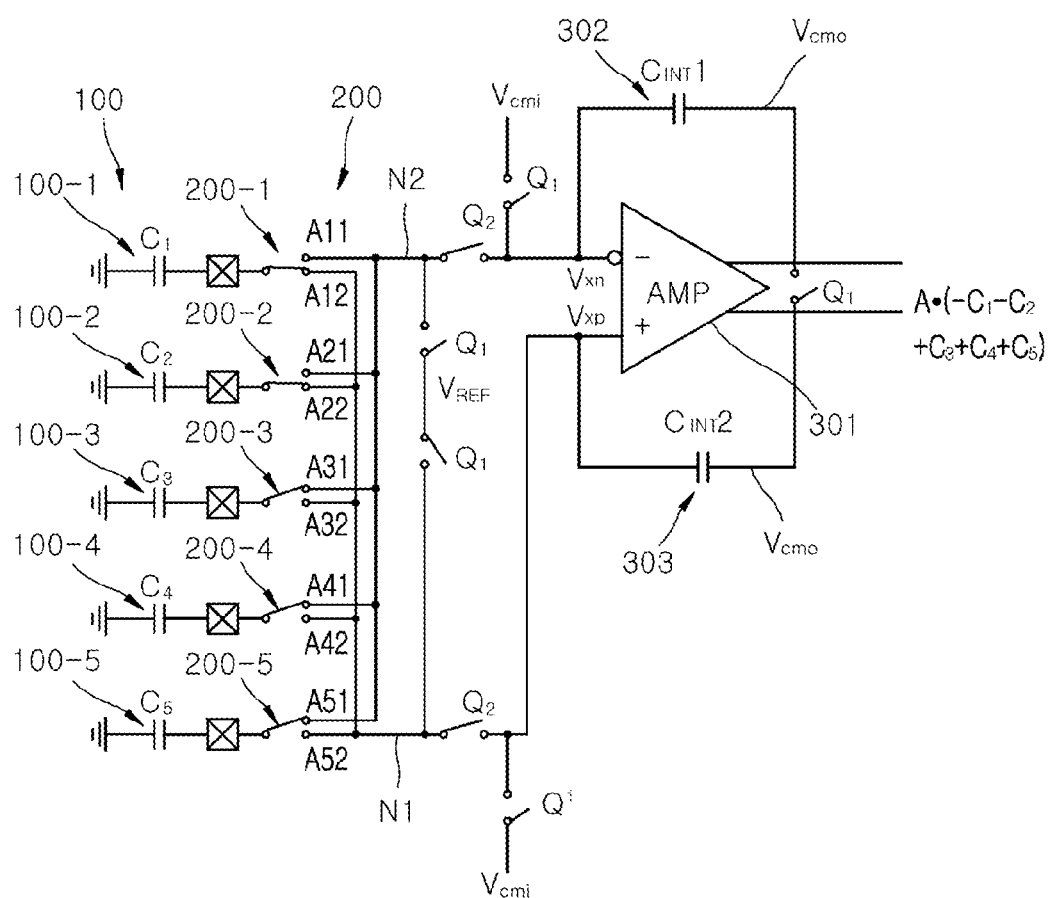

Referring to FIG. 12, during a fourth switching cycle, a fourth switching operation may be performed to respectively connect the third, fourth and fifth switches 200-3, 200-4 and 200-5 to the third, fourth and fifth terminals A31, A41 and A51 and to respectively connect the first and second switches 200-1 and 200-2 to the sixth and seventh terminals A12 and A22. Since the third, fourth and fifth switches 200-3, 200-4 and 200-5 are respectively connected to the third, fourth and fifth terminals A31, A41 and A51, the third, fourth and fifth sensors 100-3, 100-4 and 100-5 coupled to the third, fourth and fifth switches 200-3, 200-4 and 200-5 may be connected to the second node N2. Since the first and second switches 200-1 and 200-2 are respectively connected to the sixth and seventh terminals A12 and A22, the first and second sensors 100-1 and 100-2 coupled to the first and second switches 200-1 and 200-2 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Thus, the third, fourth and fifth sensors 100-3, 100-4 and 100-5 having the third, fourth and fifth capacitance values C3, C4 and C5 may be connected in parallel to the second node N2. In addition, the first and second sensors 100-1 and 100-2 having the first and second capacitance values C1 and C2 may be connected in parallel to the first node N1. Considering the equations 1 to 7, the output drive voltage Vod may be calculated by an equation of "A×(−C1−C2+C3+C4+C5)".

Figure 13:
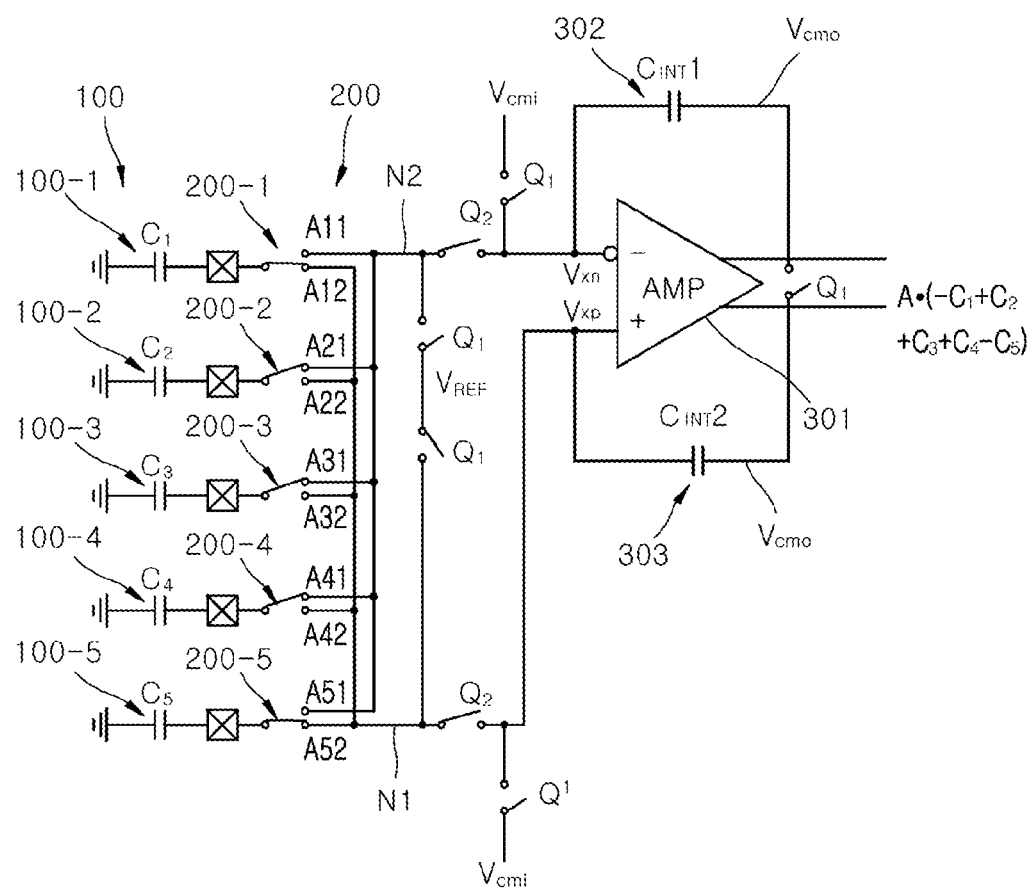

Referring to FIG. 13, during a fifth switching cycle, a fifth switching operation may be performed to respectively connect the second, third and fourth switches 200-2, 200-3 and 200-4 to the second, third and fourth terminals A21, A31 and A41 and to respectively connect the first and fifth switches 200-1 and 200-5 to the sixth and tenth terminals A12 and A52. Since the second, third and fourth switches 200-2, 200-3 and 200-4 are respectively connected to the second, third and fourth terminals A21, A31 and A41, the second, third and fourth sensors 100-2, 100-3 and 100-4 coupled to the second, third and fourth switches 200-2, 200-3 and 200-4 may be connected to the second node N2. Since the first and fifth switches 200-1 and 200-5 are respectively connected to the sixth and tenth terminals A12 and A52, the first and fifth sensors 100-1 and 100-5 coupled to the first and fifth switches 200-1 and 200-5 may be connected to the first node N1. The second node N2 may be connected to the negative input terminal of the differential amplifier 301 through one of the switches Q2 turned on while the reference voltage Vref signal has a low level, and the first node N1 may be connected to the positive input terminal of the differential amplifier 301 through the other one of the switches Q2 turned on while the reference voltage Vref signal has a low level. Thus, the second, third and fourth sensors 100-2, 100-3 and 100-4 having the second, third and fourth capacitance values C2, C3 and C4 may be connected in parallel to the second node N2. In addition, the first and fifth sensors 100-1 and 100-5 having the first and fifth capacitance values C1 and C5 may be connected in parallel to the first node N1. Considering the equations 1 to 7, the output drive voltage Vod may be calculated by an equation of "A×(−C1+C2+C3+C4−C5)".

As described with reference to FIGS. 9 to 13, two of the first to fifth sensors 100-1, 100-2, 100-3, 100-4 and 100-5 may be connected to the positive input terminal of the differential amplifier 301 during each switching cycle. Thus, the differential amplifier 301 may output an output signal having a voltage level corresponding to a capacitance value that remains after subtracting two of the first to fifth capacitance values C1~C5 from a sum of the three remaining capacitance values during each switching cycle. That is, output signals corresponding to the values of "A(C1+C2+C3−C4−C5)", "A(C1+C2−C3−C4+C5)", "A(C1−C2−C3+C4+C5)", "A(−C1−C2+C3+C4+C5)" and "A(−C1+C2+C3+C4−C5)" may be sequentially outputted from the differential amplifier 301 during the first to fifth switching cycles. Each output signal of the differential amplifier 301 may include components of the first to fifth capacitance values C1~C5. Thus, it may be necessary to extracting output data corresponding to components of the first to fifth capacitance values C1~C5 from the output signals of the differential amplifier 301.

Digital data corresponding to the digital signals 401 outputted from the ADC 400 may be expressed by the following equation 12 having a matrix form. A matrix "Md"

of the equation 12 may be a column vector having elements of "$(+C11+C22+C33-C44-C55)$", "$(+C11+C22-C33-C44+C55)$", "$(+C11-C22-C33+C44+C55)$", "$(-C11-C22+C33+C44+C55)$" and "$(-C11+C22+C33+C44-C55)$".

$$\overset{M_d}{\begin{pmatrix} +C_{11}+C_{22}+C_{33}-C_{44}-C_{55} \\ +C_{11}+C_{22}-C_{33}-C_{44}+C_{55} \\ +C_{11}-C_{22}-C_{33}+C_{44}+C_{55} \\ -C_{11}-C_{22}+C_{33}+C_{44}+C_{55} \\ -C_{11}+C_{22}+C_{33}+C_{44}-C_{55} \end{pmatrix}} \quad \text{(Equation 12)}$$

In order to extract the components C11, C22, C33, C44 and C55 corresponding to the first to fifth capacitance values C1~C5 from the equation 12, the logic circuit 500 may use timing data of operations of the switches 200-1, 200-2, 200-3, 200-4 and 200-5 included in the switching portion 200.

Switching data Ms including operation states of the switches 200-1, 200-2, 200-3, 200-4 and 200-5 during the switching cycles may be provided by the following equation 13 having a matrix form.

$$\overset{M_s}{\begin{pmatrix} +1 & +1 & +1 & -1 & -1 \\ +1 & +1 & -1 & -1 & +1 \\ +1 & -1 & -1 & +1 & +1 \\ -1 & -1 & +1 & +1 & +1 \\ -1 & +1 & +1 & +1 & -1 \end{pmatrix}} \quad \text{(Equation 13)}$$

If any one of the switches 200-1, 200-2, 200-3, 200-4 and 200-5 is connected to the positive input terminal of the differential amplifier 301 through the first node N1, the switching state of the switch connected to the positive input terminal of the differential amplifier 301 may be denoted by a negative numeral of "−1" in the matrix "Ms" of the equation 13. Alternatively, if any one of the switches 200-1, 200-2, 200-3, 200-4 and 200-5 is connected to the negative input terminal of the differential amplifier 301 through the second node N2, the switching state of the switch connected to the negative input terminal of the differential amplifier 301 may be denoted by a positive numeral of "+1" in the matrix "Ms" of the equation 13. In such a case, switching data corresponding to the switching states of the switches 200-1, 200-2, 200-3, 200-4 and 200-5 during the first to fifth switching operations may be expressed by the matrix "Ms" shown in the equation 13.

An inverse matrix "$Ms^{-1}$" of the switching data matrix "Ms" shown in the equation 13 may be expressed by the following equation 14.

$$\overset{M_s^{-1}}{\begin{pmatrix} 0.5 & 0 & 0.5 & 0 & 0 \\ 0 & 0.5 & 0 & 0 & 0.5 \\ 0.5 & 0 & 0 & 0.5 & 0 \\ 0 & 0 & 0.5 & 0 & 0.5 \\ 0 & 0.5 & 0 & 0.5 & 0 \end{pmatrix}} \quad \text{(Equation 14)}$$

As described with reference to the equation 11, the logic circuit 500 may perform an operation of multiplying the matrix "Md" of the equation 12 by the inverse matrix "$Ms^{-1}$" of the equation 14 to extract the components C11, C22, C33, C44 and C55 corresponding to the first to fifth capacitance values C1~C5 (see the following equation 15).

$$\overset{Md}{\begin{pmatrix} +C_{11}+C_{22}+C_{33}-C_{44}-C_{55} \\ +C_{11}+C_{22}-C_{33}-C_{44}+C_{55} \\ +C_{11}-C_{22}-C_{33}+C_{44}+C_{55} \\ -C_{11}-C_{22}+C_{33}+C_{44}+C_{55} \\ -C_{11}+C_{22}+C_{33}+C_{44}-C_{55} \end{pmatrix}} \cdot \overset{Ms^1}{\begin{pmatrix} 0.5 & 0 & 0.5 & 0 & 0 \\ 0 & 0.5 & 0 & 0 & 0.5 \\ 0.5 & 0 & 0 & 0.5 & 0 \\ 0 & 0 & 0.5 & 0 & 0.5 \\ 0 & 0.5 & 0 & 0.5 & 0 \end{pmatrix}} = \quad \text{(Equation 15)}$$

$$(C_{11}\ C_{22}\ C_{33}\ C_{44}\ C_{55})$$

As illustrated in the equation 15, the matrix "Md" corresponding to the output digital data 401 may include data that are obtained by sensing all of the first to fifth capacitance values C1, C2, C3, C4 and C5 five times. Thus, the digital data 501 corresponding to the first to fifth capacitance values C1, C2, C3, C4 and C5 may be obtained as a matrix form of "(C11, C22, C33, C44, C55) by operations of the logic circuit 500.

The digital data 501 may correspond to average values of data that are obtained by sensing the capacitance values C1, C2, C3, C4 and C5 five times. That is, the first to fifth sensors 100-1, 100-2, 100-3, 100-4 and 100-5 may be simultaneously sensed whenever any one of the first to fifth switching operations is performed.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:

1. A sensing device comprising:
   a sensor array portion including a plurality of sensors;
   an integrator including a differential amplifier;
   a switching portion including a plurality of switches, wherein the plurality of switches are configured to operate to connect at least one of the plurality of sensors to a first input terminal of the differential amplifier and to connect the remaining sensors of the plurality of sensors to a second input terminal of the differential amplifier during each of a plurality of successive switching cycles; and
   a logic circuit configured to perform an operation for extracting output data respectively corresponding to the plurality of sensors from an output data matrix generated by the integrator,
   wherein the integrator senses electrical characteristics of the sensors to generate the output data matrix.

2. The sensing device of claim 1,
   wherein the logic circuit performs an operation for multiplying the output data matrix by an inverse matrix of a switching data matrix; and
   wherein the switching data matrix includes elements which are denoted by a negative numeral corresponding to a switching state of the switches connected to the first input terminal of the differential amplifier and a positive numeral corresponding to a switching state of the switches connected to the second input terminal of the differential amplifier.

3. The sensing device of claim 1,
wherein the logic circuit performs an operation for multiplying the output data matrix by an orthogonal matrix of a switching data matrix; and
wherein the switching data matrix includes elements which are denoted by a negative numeral corresponding to a switching state of the switches connected to first input terminal of the differential amplifier and a positive numeral corresponding to a switching state of the switches connected to second input terminal of the differential amplifier.

4. The sensing device of claim 1, wherein the integrator outputs an output signal which is proportional to a capacitance value that remains after subtracting a capacitance value of the at least one sensor connected to the first input terminal of the differential amplifier from a sum of capacitance values of the remaining sensors connected to the second input terminal of the differential amplifier.

5. The sensing device of claim 1, further comprising an analog-to-digital converter (ADC) coupled between the integrator and the logic circuit to convert an output signal of the differential amplifier into a digital signal corresponding to the output data matrix.

6. The sensing device of claim 1, wherein the integrator includes:
a first feedback capacitor coupled between one output terminal of the differential amplifier and the second input terminal of the differential amplifier; and
a second feedback capacitor coupled between the other output terminal of the differential amplifier and the first input terminal of the differential amplifier.

7. The sensing device of claim 1, wherein the plurality of switches operate to connect at least two of the plurality of sensors to the second input terminal of the differential amplifier during each of the plurality of successive switching cycles.

8. The sensing device of claim 1, wherein the plurality of switches operate to connect one of the plurality of sensors to the first input terminal of the differential amplifier during each of the plurality of successive switching cycles.

9. The sensing device of claim 1, wherein the plurality of switches operate to connect at least two of the plurality of sensors to the first input terminal of the differential amplifier during each of the plurality of successive switching cycles.

10. The sensing device of claim 1, wherein each of the sensors includes a capacitor that stores variation of a capacitance value.

11. A sensing device comprising:
a sensor array portion including first to fourth sensors;
an integrator including a differential amplifier;
a switching portion including a plurality of switches that are configured to sequentially perform first to fourth switching operations, wherein the first switching operation is performed to connect the fourth sensor to a first input terminal of the differential amplifier and to connect the first to third sensors to a second input terminal of the differential amplifier, the second switching operation is performed to connect the third sensor to the first input terminal of the differential amplifier and to connect the first, second and fourth sensors to the second input terminal of the differential amplifier, the third switching operation is performed to connect the second sensor to the first input terminal of the differential amplifier and to connect the first, third and fourth sensors to the second input terminal of the differential amplifier, and the fourth switching operation is performed to connect the first sensor to the first input terminal of the differential amplifier and to connect the second, third and fourth sensors to the second input terminal of the differential amplifier; and
a logic circuit configured to perform an operation for multiplying an output data matrix outputted from the integrator by an inverse matrix of a switching data matrix,
wherein the switching data matrix includes elements which are denoted by a numeral of "−1" corresponding to a switching state of the switches connected to the first input terminal of the differential amplifier and a numeral of "+1" corresponding to a switching state of the switches connected to the second input terminal of the differential amplifier.

12. The sensing device of claim 11, wherein the inverse matrix of the switching data matrix is identical to an orthogonal matrix of the switching data matrix.

13. The sensing device of claim 11, wherein the integrator outputs an output signal which is proportional to a capacitance value that remains after subtracting a capacitance value of the sensor connected to the first input terminal of the differential amplifier from a sum of capacitance values of the sensors connected to the second input terminal of the differential amplifier.

14. The sensing device of claim 11, further comprising an analog-to-digital converter (ADC) coupled between the integrator and the logic circuit to convert an output signal of the differential amplifier into a digital signal corresponding to the output data matrix.

15. A sensing device comprising:
an integrator configured to sense electrical characteristics of first and second nodes to generate an output voltage; and
a switching portion configured to include a plurality of switches, wherein the plurality of switches operate to connect at least one of the plurality of switches to the first node and to connect the remaining switches of the plurality of switches to the second node during each of a plurality of successive switching cycles.

16. The sensing device of claim 15, wherein the integrator generates the output voltage by substantially simultaneously sensing all of the voltage values of the switches for each of the switching cycles.

17. The sensing device of claim 15, wherein the integrator includes a differential amplifier configured to have a first input terminal coupled to the first node and a second input terminal coupled to the second node.

18. The sensing device of claim 15, wherein the switching portion has a greater number of switches than a number of integrators.

19. The sensing device of claim 15,
further comprising a sensor array including a plurality of sensors,
wherein the plurality of switches operate to connect the at least one of the plurality of sensors to the first node and to connect the remaining sensors of the plurality of sensors to the second node during each of the switching cycles.

20. The sensing device of claim 15, further comprising:
a logic circuit configured to perform an operation for extracting output data respectively corresponding to the plurality of switches from the output voltage generated by the integrator.

* * * * *